Figure 9:
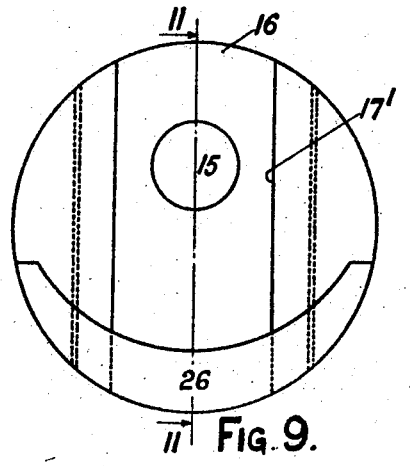

Dec. 31, 1929.  G. R. INSHAW  1,741,570
TRANSMISSION GEAR FOR OVERHEAD ENGINE CAMSHAFTS
Filed Jan. 6, 1928   2 Sheets-Sheet 1
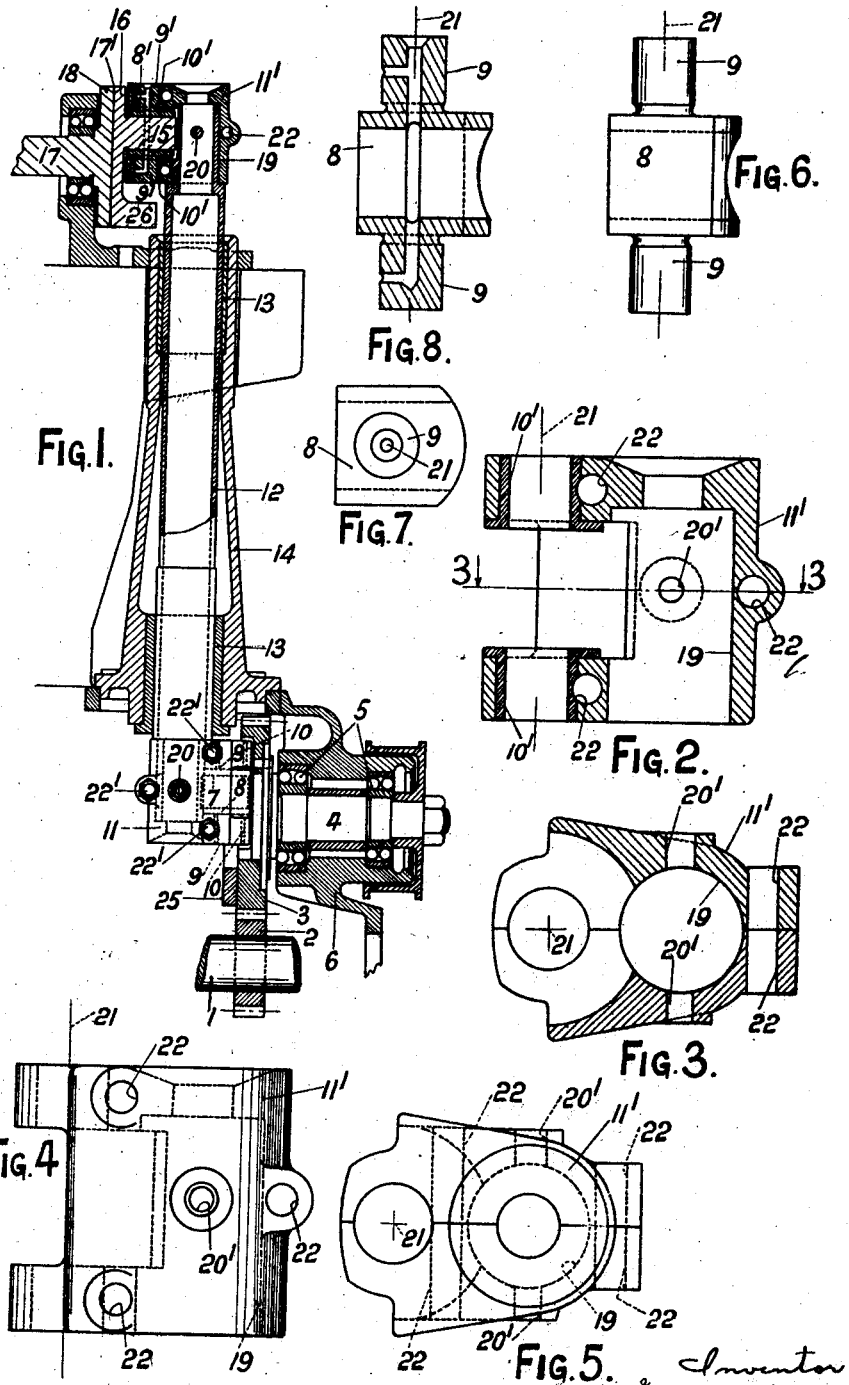

Dec. 31, 1929.                G. R. INSHAW                1,741,570
               TRANSMISSION GEAR FOR OVERHEAD ENGINE CAMSHAFTS
                         Filed Jan. 6, 1928        2 Sheets-Sheet 2

Patented Dec. 31, 1929

1,741,570

UNITED STATES PATENT OFFICE

GEORGE RICHARD INSHAW, OF GLASGOW, SCOTLAND

TRANSMISSION GEAR FOR OVERHEAD ENGINE CAM SHAFTS

Application filed January 6, 1928, Serial No. 244,814, and in Great Britain March 16, 1927.

My invention has for its object improved means for transmitting motion either directly or indirectly from the crankshaft or half speed shaft to the overhead camshaft of an internal combustion engine.

According to my invention rotary motion is transmitted from the half speed shaft (in the instance taken) to the overhead camshaft parallel thereto by means of a shaft or bar, perpendicular to both rotary shafts, one end of which shaft or bar is provided with a trunnion fitting whose pivotal axis is parallel to and at suitable radius from the axis of the said shaft or bar. Alternatively I may use a ball joint member whose centre is at a suitable radius from the axis of the said shaft or bar.

The said trunnion fitting or ball joint member engages a crankpin, eccentric or counterpart member mounted upon or formed integrally with the half speed shaft and the said shaft or bar is carried in a casing attached to or forming part of the engine crankcase or cylinder block in such a manner as to permit both reciprocating and oscillating movement of said shaft or bar along and about its axis.

The other end of the said shaft or bar is provided with a similar trunnion fitting or ball joint member which engages a crankpin, eccentric or counterpart member attached to the overhead camshaft (in the instance taken) to which rotary motion will be imparted.

In order to take care of a considerable inaccuracy in the effective distance between the axes of the driving and driven shafts I prefer to mount at least one of the said trunnion fittings or ball joint members upon the said shaft or bar in such a manner as will permit of adjustment so that the distance between the axes of the driving and driven crankpins or eccentrics or counterpart members may be brought to coincide substantially with the distance between the axes of the driving and driven shafts.

In order to accommodate any small variations in the distance between the axes of the driving and driven shafts which may occur through the longitudinal expansion of the cylinder block or crankcase in a direction approximately parallel to the cylinder axis or other slight inaccuracies which inevitably arise especially in detachable cylinder head engines wherein the thickness of the gasket is liable to vary from time to time, I mount the said trunnion fitting or ball joint member at one end of the said shaft or bar so that it engages its respective crankpin or eccentric or counterpart member in such a manner as will permit of slight radial movement of the said trunnion fitting or ball-joint member relatively to the axis of the said overhead camshaft (in the instance taken).

The said crankpin or eccentric or counterpart member of the overhead camshaft may for instance be carried by a block capable of sliding radially in a guide attached to the overhead camshaft.

The said shaft or bar may be approximately balanced by providing the rotating members with counter balance weights, and in order that both the driving and driven rotating members may effectively contribute to such balancing means notwithstanding the non-rigidity of the crankpin or eccentric or counterpart member which is capable of radial movement in relation to the axis of the shaft to which it is attached, I mount the said balance weight (in this instance) upon the block which carries the radially movable crankpin or eccentric or counterpart member and thereby avoid torsional and other stresses which would be set up in the said shaft or bar due to unbalanced inertia forces. It will be seen that the sliding block together with the crankpin or eccentric and balance weight is self-contained so that the balance weights of both the driving and driven rotating members function on approximately equal terms.

As it is not possible fully to balance the reciprocating and oscillating shaft or bar by providing balance weights on the rotating members alone due to the unbalanced horizontal component, I may provide an additional mass or masses carried by, and at suitable radius from the axis of, the said shaft or bar; the chord which subtends the angle through which the additional mass, or masses, swings or swing being in excess of the vertical movement of the shaft or bar, i. e., movement parallel to the axis of the said shaft or bar, to the extent necessary to cancel out the unbalanced horizontal component arising from the rotating balancing weights, which are in correct relationship to the said additional mass or masses.

Figure 11:
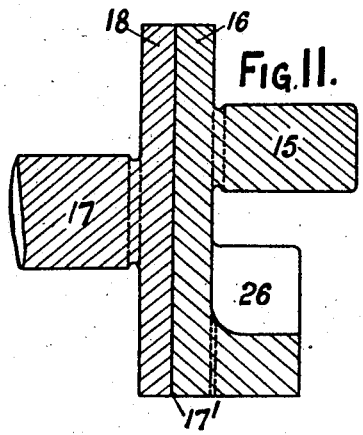
Figure 10:
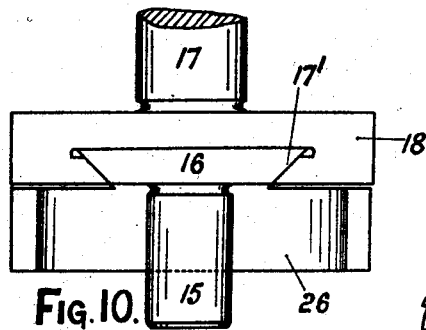
Figure 13:
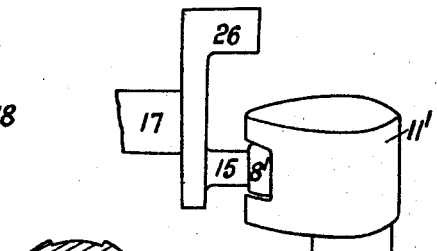
Figure 12:
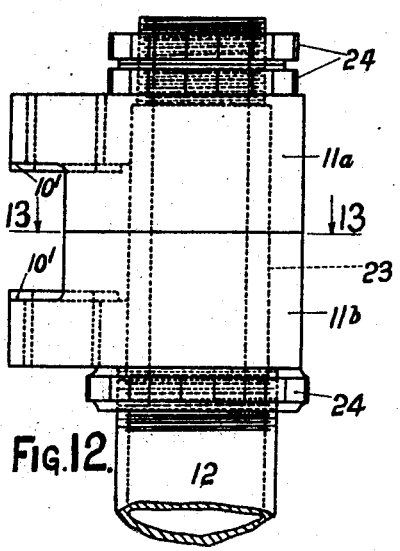
Figure 14:
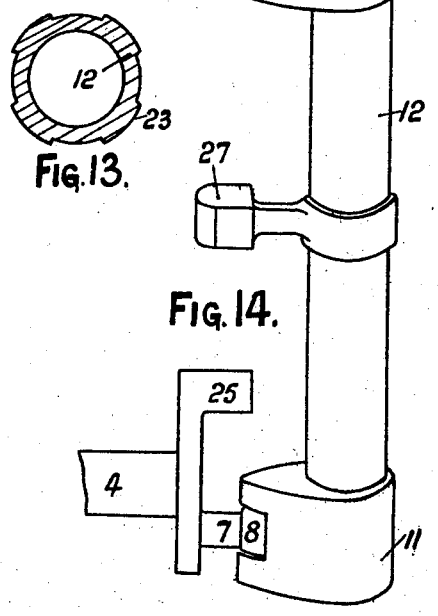

In the accompanying drawings which illustrate a transmission gear according to the invention Fig. 1 is a part elevation part vertical section showing a preferred arrangement thereof; Fig. 2 is a detail vertical section drawn to a larger scale showing a trunnion housing. Fig. 3 is a horizontal section on the line 3—3 of Fig. 2; Figs. 4 and 5 are, respectively, an elevation and a plan view of the trunnion housing; Figs. 6 and 7 are detail views at right angles to one another showing a trunnion block and Fig. 8 is a vertical section thereof; Figs. 9 and 10 are detail views at right angles to each other showing the slidably mounted crank pin on the overhead camshaft; Fig. 11 is a section on the line 11—11 of Fig. 9; Fig. 12 is an elevation showing an alternative construction of trunnion housing which is adjustably mounted on the upper end of the transmission shaft; Fig. 13 is a section of the transmission shaft on the line 13—13 of Fig. 12; Fig. 14 is a diagrammatic view showing a proposed balancing arrangement.

Referring to Fig. 1, 1 denotes a crank shaft or an extension of the crank shaft of an internal combustion engine, operatively connected through intermeshing two-to-one gears 2, 3 to a half-speed shaft 4 journalled in ball bearings 5 housed in a casing 6 which may form part of the engine crank case.

Unitary with the shaft 4 is a crank pin 7 engaging a trunnion block 8 (Figs. 6–8) formed with trunnions 9 journalled in bushes 10 fixed in a housing 11 secured to the lower end of a hollow vertical shaft 12 journalled in bushes 13 fixed in a stationary casing 14.

Secured to the upper end of the vertical shaft 12 is a housing 11' on which are fixed bushes 10' serving to receive trunnions 9' of a trunnion block 8' operatively engaged by a crank pin 15 unitary with a block 16 slidable radially to a slight extent relatively to an overhead cam shaft 17 in a slot 17' formed in a flange 18 integral with the shaft 17.

The arrangement is such that on rotation of the shaft 4 there is imparted to the shaft 12 a combined reciprocating and oscillating motion along and about the axis of said shaft 12 whereby rotary motion is transmitted to the driven overhead cam shaft 17.

The housings 11 and 11' are split axially, the halves of each housing when bolted together by bolts 22' passing through apertures 22 defining a cylindrical recess 19 adapted to embrace one end of the shaft 12. The pivotal axes 21 of the trunnion blocks 8, 8' are parallel to the axis of the shaft 12, and are disposed at a distance therefrom.

The illustrated mounting of the upper crank pin 15 on the overhead cam shaft 17 accommodates any small variations in the distance between the driving shaft and the driven shaft 4 and 17, respectively, due to longitudinal expansion of the cylinder block or crank case in a direction approximating parallel to the cylinder axis or other slight inaccuracies.

In order to take care of considerable inaccuracy in the distance between the driving shaft and the driven shaft, the housing 11' may be split transversely as shown in detail in Fig. 12, the upper and lower halves 11$^a$, 11$^b$ respectively, of the housing being in splined engagement as shown at 23 with the upper end of the hollow shaft 12, on which are threaded spaced nuts 24 between which are interposed the trunnion housing members 11$^a$, 11$^b$. The arrangement is such that the trunnion housing may be axially adjusted on the shaft 12 whereby the distance between the axes of the driving and the driven crank pins 7 and 15, respectively, may be brought to coincide substantially with the distance between the axes of the driving and the driven shafts.

The shaft 12 may be approximately balanced as shown at Fig. 1 by providing the rotating members 3 and 16 with counterbalance weights 25, 26, respectively. In order that both the driving and the driven rotating members may effectively contribute towards the balancing of the shaft 12 notwithstanding the non-rigidity of the upper crank pin 15 which is capable of radial movement in relation to the cam shaft 17, the weight 26 is mounted on the block 16 unitary with the crank pin 15, the arrangement also being such that torsional and other stresses which would be set up in the shaft 12, due to unbalanced inertia forces, are avoided. It will be seen that the block 16 together with the crank pin 15 and the balance weight 26 is self-contained so that the balance weights of both the driving and the driven rotating members 3 and 16 function on approximately equal terms.

Fig. 14 shows diagrammatically a balancing arrangement which may be adopted. In this figure the driving and the driven shafts 4 and 17, respectively, are shown disposed in the same plane and on the same side of the axis of the shaft 12. As it is not possible fully to balance the reciprocating and oscillating shaft 12 by providing weights on the rotating members alone due to the unbalanced horizontal component, there is provided an additional mass 27 carried by, and at a suitable radius from, the axis of the hollow shaft 12, the chord which subtends the angle through which the mass 27 swings being in excess of its vertical movement to the extent necessary to cancel out the unbalanced horizontal component arising from the rotating weights 25, 26 which are in correct relationship to the mass 27.

When (as shown in Fig. 1) the driving and driven shafts 4 and 17 are disposed 180 degrees apart relatively to the axis of the shaft 12 there may be provided two or more additional masses disposed about the axis of the shaft 12 so that no unbalanced couple will be set up.

It will be understood that in Fig. 1 the direction of rotation of the cam shaft 17 is reversed with respect to the direction of rotation of the half speed shaft 4, while in Fig. 14 the direction of rotation of the driving shaft is the same as that of the driven shaft.

For the purpose of the above description it is assumed that the shaft 12 has no other function except to transmit rotation from the half-time shaft to the overhead camshaft; in fact, however, the shaft 12 may be utilized as a source of power for actuating auxiliary devices or systems, such, for example, as an oil pump or the like.

I claim:—

1. Transmission gear for the overhead cam shaft of an internal combustion engine comprising parallel rotary driving and driven shafts, an intermediate shaft confined to axial reciprocating movement and oscillating movement about its axis perpendicular to said rotary shafts, a set of eccentric elements rotating with said rotary shafts, and a set of eccentric-engaging elements at spaced points of said intermediate shaft, said eccentric-engaging elements having pivotal centres spaced radially from the axis of said intermediate shaft, the elements of one set having freedom for movement in the direction towards and away from the intermediate shaft, at least one of said elements having freedom for self-adjustment in a direction radial to one of said rotary shafts to accommodate automatically variations in the spacing of said rotary shafts.

2. Transmission gear for the overhead cam shaft of an internal combustion engine, comprising parallel rotary driving and driven shafts, an intermediate shaft confined to axial reciprocating movement and oscillating movement about its axis perpendicular to said rotary shafts, a set of eccentric elements rotating with said rotary shafts, and a set of eccentric-engaging elements at spaced points of said intermediate shaft, said eccentric-engaging elements having pivotal centres spaced radially from the axis of said intermediate shaft, the elements of one set having freedom for movement in the direction towards and away from the intermediate shaft, at least one of said elements having freedom for self adjustment in a direction radial to one of said rotary shafts to accommodate automatically variations in the spacing of said rotary shafts, and at least one of said eccentric-engaging elements being adjustable axially of the intermediate shaft.

3. Transmission gear for the overhead cam shaft of an internal combustion engine, comprising parallel rotary driving and driven shafts, an intermediate shaft confined to axial reciprocating movement and oscillating movement about its axis perpendicular to said rotary shafts, a set of eccentric elements rotating with said rotary shafts, and a co-operative set of eccentric-engaging elements at spaced points of said intermediate shaft, said eccentric-engaging elements having pivotal centres spaced radially from the axis of said intermediate shaft, the elements of one set having freedom for movement in the direction towards and away from the intermediate shaft, the effective radial distance of one eccentric element from the axis of its respective rotary shaft being automatically variable with variations in the spacing of said rotary shafts.

4. Transmission gear for the overhead cam shaft of an internal combustion engine comprising parallel rotary driving and driven shafts, balance weights rotating with said rotary shafts, an intermediate shaft confined to axial reciprocating movement and oscillating movement about its axis perpendicular to said rotary shafts, a set of eccentric elements rotating with said rotary shafts, and a co-operative set of eccentric-engaging elements at spaced points of said intermediate shaft, said eccentric-engaging elements having pivotal centres spaced radially from the axis of said intermediate shaft, the elements of one set having freedom for movement in the direction towards and away from the intermediate shaft, at least one of said eccentric elements having freedom for self-adjustment whereby the effective radial distance of said eccentric element from the axis of its rotary shaft may be automatically varied to accommodate variations in the spacing of said rotary shafts.

5. Transmission gear for the overhead cam shaft of an internal combustion engine comprising parallel rotary driving and driven shafts, an intermediate shaft confined to axial reciprocating movement and oscillating movement about its axis perpendicular to said rotary shafts, an eccentric element upon one of said rotary shafts, a balance weight carried by said last named rotary shaft, a guide carried by the other rotary shaft, a block unitary with a second eccentric element, said block being self-adjustable in said guide, a balance weight carried by said block, and elements at spaced points engaging said eccentric elements, said last named elements having bearing centres spaced radially from the axis of said intermediate shaft.

6. Transmission gear for overhead cam shafts of internal combustion engines comprising parallel rotary driving and driven shafts, an intermediate shaft mounted for axial reciprocating movement and oscillating movement about its axis perpendicular to said rotary shafts, balance weights carried by said rotary shafts, eccentric elements rotating with said rotary shafts, an eccentric-engaging device at each end of said intermediate shaft, said eccentric-engaging devices having bearing centres spaced radially from the axis of said intermediate shaft, and a balance weight carried by said intermediate shaft, said last mentioned balance weight so spaced radially from the axis of said intermediate shaft that the chord subtending the angle through which said last mentioned balance weight swings exceeds the axial movement of said intermediate shaft.

In testimony whereof I have signed my name to this specification.

GEORGE RICHARD INSHAW.